(12) United States Patent
Lederman et al.

(10) Patent No.: US 10,282,491 B2
(45) Date of Patent: May 7, 2019

(54) SYSTEM AND METHOD FOR ENGINEERING AND DETAILING STEEL JOINTS IN A STEEL STRUCTURE

(71) Applicant: QNECT LLC, Hadley, MA (US)

(72) Inventors: Henry Lederman, Amherst, MA (US); Jeffrey Alan Hausthor, Pelham, MA (US); Ilya Ponomarev, Amherst, MA (US); Daniel George Grubbs, Amherst, MA (US)

(73) Assignee: QNECT LLC, Hadley, MA (US)

( * ) Notice: Subject to any disclaimer, the term of this patent is extended or adjusted under 35 U.S.C. 154(b) by 650 days.

(21) Appl. No.: 14/704,813

(22) Filed: May 5, 2015

(65) Prior Publication Data
US 2015/0317415 A1 Nov. 5, 2015

Related U.S. Application Data

(60) Provisional application No. 61/988,755, filed on May 5, 2014.

(51) Int. Cl.
*G06F 17/50* (2006.01)
(52) U.S. Cl.
CPC ............... *G06F 17/5004* (2013.01)
(58) Field of Classification Search
CPC .................................. G06F 17/5004

USPC ............................................ 703/1
See application file for complete search history.

(56) References Cited

U.S. PATENT DOCUMENTS

| 5,680,738 | A | 10/1997 | Allen et al. |
| 7,617,076 | B2 | 11/2009 | Rousu et al. |
| 2001/0034590 | A1 | 10/2001 | Onodera et al. |
| 2004/0073410 | A1 | 4/2004 | Maly et al. |
| 2013/0275092 | A1 | 10/2013 | Murali |

*Primary Examiner* — Hugh M Jones
(74) *Attorney, Agent, or Firm* — Kriegsman & Kreigsman (57) ABSTRACT

A system for engineering and detailing joints in a steel structure includes a compute device that is electronically linked with a web-enabled server. In use, the system engages in an automated process of connecting the various joints in the steel structure by first collecting basic connection preferences via the compute device. Additionally, raw data is extracted from a computer model of the steel structure on the compute device. Using the connection preferences and raw data, the server analyzes framing interrelationships and engineers the connection details for each joint based upon connection preferences and load requirements. Taking into account the connection details of other local joints in the steel structure, the server utilizes an iterative engineering process to ensure that the connection details satisfy structural loads in a cost-effective fashion. Upon completion, the engineered connection details are uploaded back into the computer model of the steel structure on the compute device.

18 Claims, 5 Drawing Sheets

SYSTEM AND METHOD FOR ENGINEERING AND DETAILING STEEL JOINTS IN A STEEL STRUCTURE

FIELD OF THE INVENTION

The present invention relates generally to the construction industry and more particularly to systems and methods for engineering and detailing the interconnection of steel members in a steel framed structure.

BACKGROUND OF THE INVENTION

Buildings, bridges and other similar constructions traditionally rely upon a steel structure to transmit/transfer internal and external loads to the foundation. The steel framing of a structure includes a plurality of interconnected structural members. Structural steel members are commonly categorized as beams, columns, trusses or bracing, depending upon the manner in which the member is designed to handle, or carry, its load.

Columns, which are disposed in a vertical orientation, are structural members that transmit loading from beams to the foundation. Beams are structural members that are disposed in a horizontal or diagonal orientation within the structure. Bracing are structural members that restrain beams and columns from being displaced/moved from their original location. A structural steel frame consisting of these members is generally designed to carry live, dead, seismic, wind and sometimes cyclic loads. In addition, structural steel frames are often designed to carry loads resulting from snow, ice, or other loads specific to the geographic location, weather conditions, or customized design requirements, such as loads resulting from a blast.

The most common cross-sectional shape of a steel member is an I-shape. The opposing, parallel, horizontal elements of an I-shaped member are commonly referred to in the industry as "flanges." The single vertical element that extends between and perpendicular to the pair of flanges is commonly referred to as the "web." Accordingly, it is understood that a member with an I-shape cross-section, commonly referred to in the art simply as an I-beam (wide flange), typically transmits shear forces through its web and bending forces through its flanges. Other common shapes are "L", "C", rectangular or circular shapes.

Figure 1:
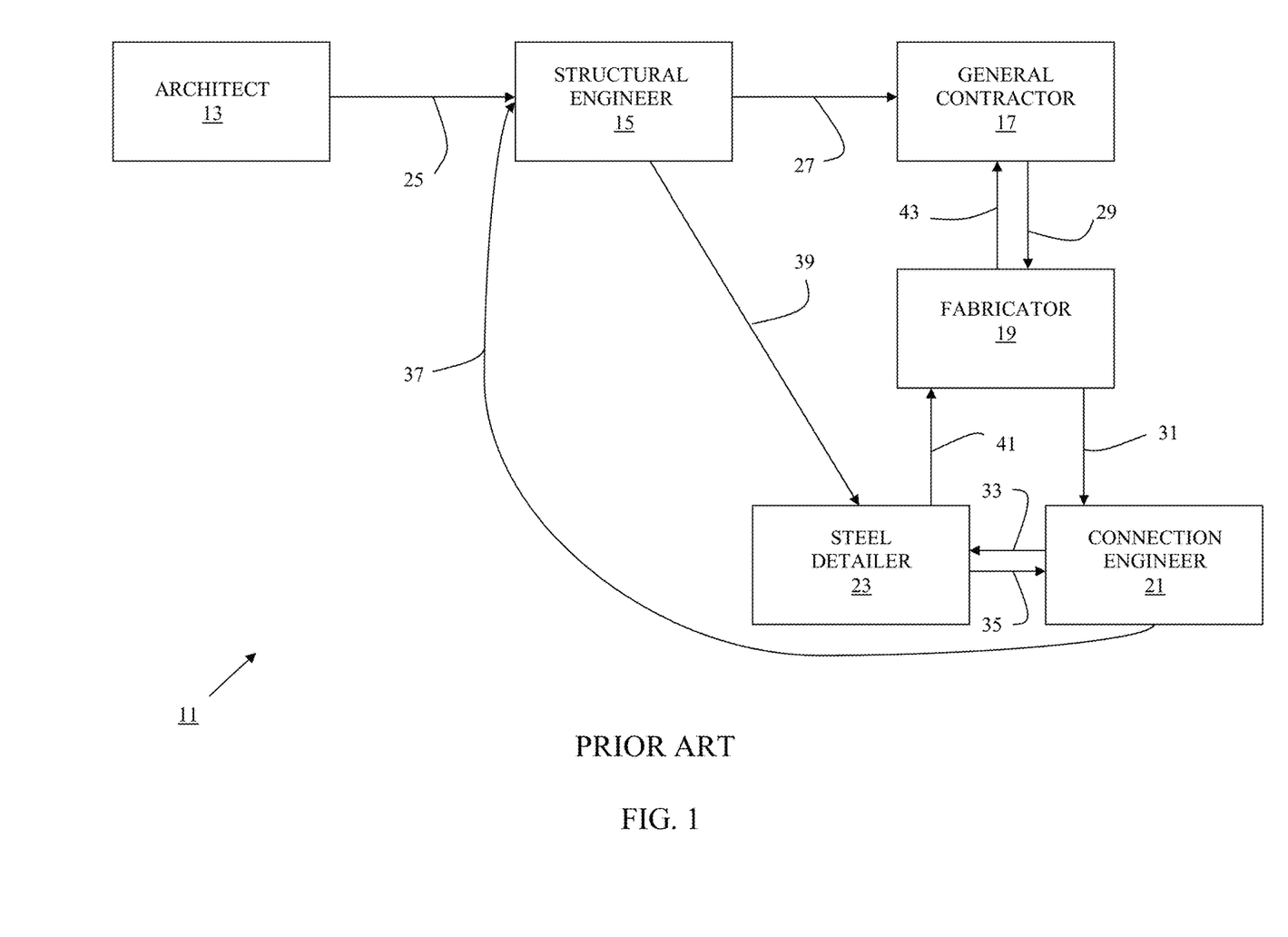
FIG. 1 is a simplified block diagram of a well-known prior art system for constructing a building or other similar construction.

Referring now to FIG. 1, there is shown a simplified block diagram of a well-known prior art system for constructing a building or other similar construction, the system being identified generally by reference numeral 11. As can be seen, system 11 typically includes a plurality of disparate functional groups, or entities, that are responsible for one or more particular tasks in constructing the building. Specifically, as will be explained further in detail below, system 11 commonly includes an architect 13 for creating the overall design of the building, a structural engineer 15 for designing the basic steel structure to handle the load requirements of the building, a general contractor 17 for overseeing the erection of the steel structure of the building at the building site, a fabricator 19 for supplying to general contractor 17 the various steel structure materials to the engineered specifications, a connection engineer 21 for determining a range of suitable connection possibilities between various structural members, and a steel detailer 23 for modeling the steel structure and finalizing the particular means of connection between various structural members based on the load requirements set forth by connection engineer 21.

As the primary step in the construction process, architect 13 draws the design of the structure, including the particular materials to be utilized, and forwards the architectural drawings to structural engineer 13, as depicted by arrow 25. In turn, structural engineer 15 (also commonly referred to in the art as the engineer of record, or EOR,) designs the basic steel structure to handle the various load requirements of the building, including basic design requirements (e.g. unique load requirements due to the inclusion of a pool or balcony) as well as environmental factors (e.g. seismic and wind conditions to be considered). The steel structure designed by structural engineer 15 is then passed to general contractor 17, as represented by arrow 27, for erection of the construction.

However, it should be noted that traditional structural design drawings prepared by structural engineer 15 do not always include a complete set of details relating to how the individual structural members are to be interconnected (or at least do not always fully detail and not always across all conditions) but, more often, are general in nature.

Accordingly, general contractor 17 sends the structural design drawings to fabricator 19, as represented by arrow 29. Fabricator 19, in turn, forwards the structural design drawings to connection engineer 21 to evaluate the requisite load requirements of each point of interconnection between joined structural members, as represented by arrow 31.

As part of the connection engineering process undertaken by engineer 21, each point of interconnection, or joint, between structural members is evaluated based on its various load requirements. In view thereof, connection engineer 21 establishes a sizable number of connection parameters, often organized as a hierarchal list of rules or preferences, as well as a range of acceptable load requirements for each joint that are, in turn, passed to steel detailer 23, as represented by arrow 33.

Notably, connection engineer 21 defines the basic category for each joint, which in turn further defines the connection details. The joint category relates to the way that steel members are to be interconnected. In the art, there are many joint categories, the most common interconnections are (i) beam to beam (i.e., connecting one beam to another, supporting beam), (ii) beam to column flange (i.e., connecting a beam to the flange of a column), and (iii) beam to column web (i.e., connecting a beam to the web of a column). As can be appreciated, the identification of the various joint categories in a structure is significant because each category experiences unique load transfer properties.

Based largely upon the particular joint category selected, connection engineer 21 further determines the specific method of connection (i.e. the connection details) for each joint. The connection details relate to the two or more steel members that are to be permanently joined. Accordingly, the connection details include all relevant parameters relating to the means of interconnection. The most common connective elements used are rectangular steel plates and "L" shaped brackets (plates and angles). The means by which these connective elements are secured to the supporting and the supported members is through the use of connective bolts and weld lines. These are often referred to in the industry as "job standards." Each job standard form specifies the joint category (e.g. beam to beam, beam to column flange, etc.) and the connection details (e.g. an L-shaped bracket connected to the supporting and supported members) for a corresponding connection in a steel structure.

It should be noted that the bolts or welds used to secure connective elements are often placed/prepared either in the fabrication facility (i.e. in a shop of fabricator 19) or delivered to the construction site and placed/prepared at the time the two or more steel member are joined. For example, a steel connective plate can be welded to one member in the fabricator shop, while the bolts used to connect the plate to the other steel member are installed at the construction site ("field").

Steel detailer 23, who has a very distinct skill set in relation to connection engineer 21, uses the connection parameters and acceptable load ranges for each joint established by connection engineer 21, generates a three-dimensional model of the steel structure, and uses the job standards developed by connection engineer 21 to connect each joint in the model, commonly referred to in the art as detailing to further define the exact manner in which the individual steel members are to be permanently joined to form the steel structure (e.g. using six bolts of a particular size and grade). That is, the specific connection details for each joint are manually input by detailer 23 into the computer-aided modeling system on a joint-by-joint basis.

As can be appreciated, structural steel connection design requires taking into account a myriad of factors including, but not limited to, (i) the ability to effectively transfer load stresses between members, (ii) the amount of material used to form a suitable connection (e.g. the cost component associated therewith), (iii) the ability to form a joint in the field (i.e. the expected difficulty associated in connecting a joint in a particular manner), (iv) general project requirements imposed by structural engineer 15 and/or steel fabricator 19 (e.g. to meet certain specifications and/or minimize material costs), and (v) the coordinate relationship between structural members (e.g. potential structural obstacles within the connection region).

If the detailing particulars are deemed acceptable by connection engineer 21, as represented by arrow 35, the job standard forms are stamped as approved by connection engineer 21, and are, in turn, sent by connection engineer 21 to structural engineer 15 for approval, as represented by arrow 37. Upon approval by structural engineer 15, as represented by arrow 39, the job standard forms and corresponding electronic files for the steel structure are sent to fabricator 19, as represented by arrow 41. Fabricator 19 is then able to manufacture and mark all the necessary components for the steel structure to the requested specifications and, in turn, deliver the components to the general contractor 17 at the designated site for erection of the construct, as represented by arrow 43.

As can be appreciated, the above-described steel structure construction process has been found to suffer from a number of notable shortcomings.

As a first shortcoming, the aforementioned process relies upon a large number of disparate entities that are required to undertake separate, yet complementary, sets of tasks. At the same time, it should be noted that the connection engineering and detailing process undertaken by connection engineer 21 and steel detailer 23 are often largely influenced by basic requirements set forth by structural engineer 15 as well as material preferences established of fabricator 19 (e.g. if fabricator 19 can obtain or construct a particular component at a reduced cost). However, because each entity operates in a largely autonomous nature and has limited means to communicate with other entities in system 11, the overall construction process is rendered largely inefficient.

As a second shortcoming, the aforementioned process of engineering and detailing a joint includes two separate steps that are undertaken by two separate entities. Specifically, the aforementioned joint connection process requires a connection engineer 21 to first manually engineer a range of suitable connection parameters for each joint. Thereafter, a steel detailer 23 is required to manually input the engineered connection parameters into a computer modeling system, thereby increasing costs, restricting productivity, and potentially impacting the quality/accuracy of the connection.

As a third shortcoming, because support structures can include hundreds to thousands of joints, the manual component associated with engineering and detailing each joint renders the process rather time-consuming in nature.

As a fourth shortcoming, the utilization of load ranges by connection engineer 21 during the engineering step of the structural detailing process creates a significant degree of engineering uncertainty and, as such, requires the review of every connected condition input by detailer 23 to ensure compliance. Furthermore, detailing that results in load conditions that fall outside of the defined range require individualized redesign by engineer 21, thereby further lengthening the overall process.

SUMMARY OF THE INVENTION

It is an object of the present invention to provide a new and improved system and method for engineering and detailing joints in a steel structure.

It is another object of the present invention to provide a system and method as described above that permits and facilitates the exchange of information between the various entities involved in the design and construction of the steel structure.

It is yet another object of the present invention to provide a system and method as described above that allows for the engineering and detailing of joins in a steel structure in an efficient and cost-effective fashion.

It is still another object of the present invention to provide a system and method as described above that minimizes the degree of engineering uncertainty and thereby limits the extent of detailing review to ensure compliance.

Accordingly, as one feature of the present invention, there is provided a system for engineering and detailing a plurality of joints in a steel structure, the system comprising (a) a first compute device provided with a computer model of the steel structure, the first compute device being adapted to define a set of connection preferences and the load-bearing requirements for each of the plurality of joints, and (b) a server in electrical communication with the compute device, (c) wherein the server is adapted to receive raw data from the computer model of the steel structure, the set connection preferences, and the load-bearing requirements and automatically engineer a means of connection for each of the plurality of joints in compliance therewith.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

System 111 for Engineering and Detailing Joints in a Steel Structure

Figure 2:
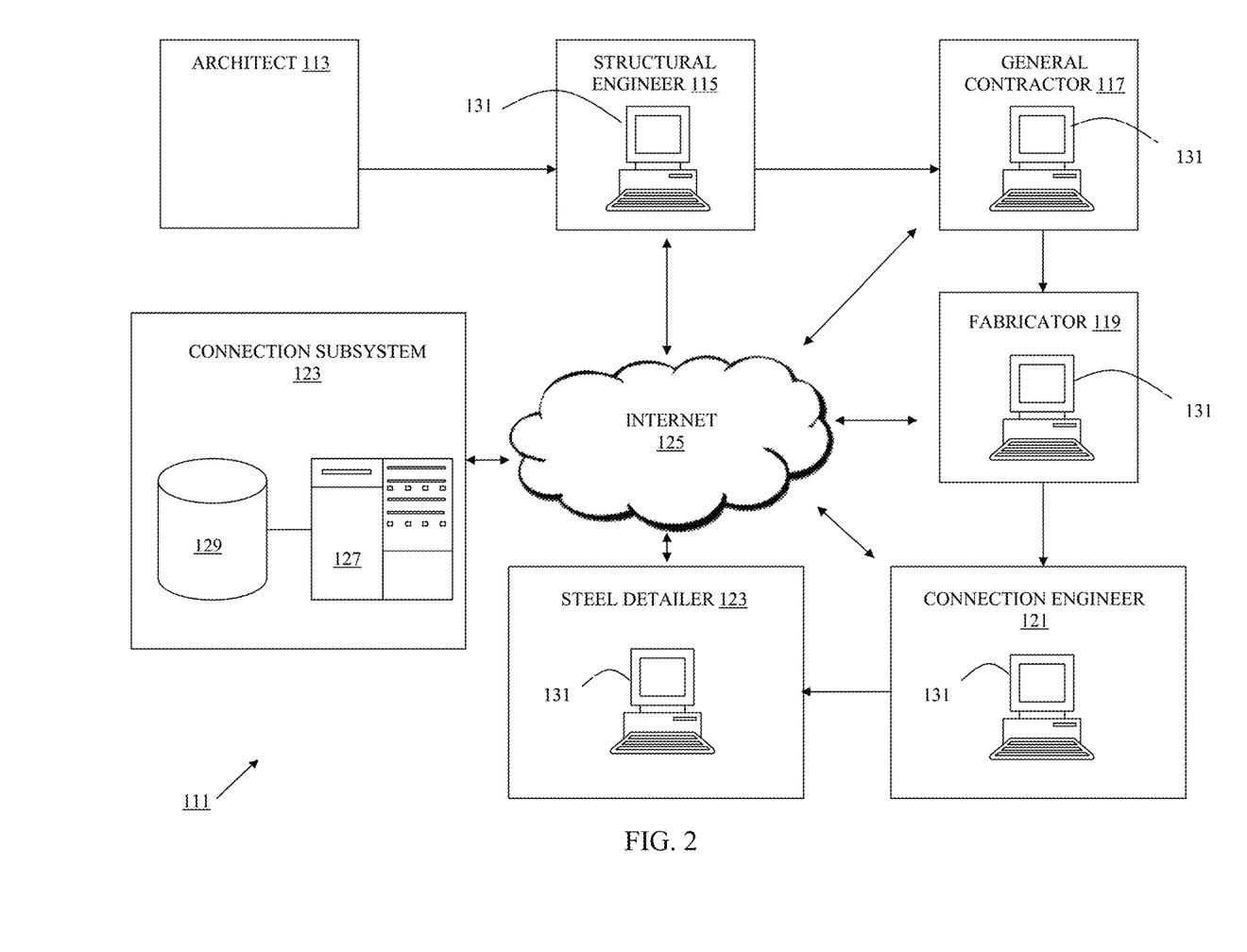
FIG. 2 is a simplified block diagram of a novel system for constructing a building or other similar construction, the system being constructed according to the teachings of the present invention.

Referring now to FIG. 2, there is shown a simplified block diagram of a novel system for constructing a building, the system being constructed according to the teachings of the present invention and identified generally by reference numeral 111. As will be explained in detail below, system 111 facilitates the exchange of data between the principal entities involved in the construction of a building, thereby minimizing costs, ensuring accuracy, and streamlining the efficiency of the overall process, which is highly desirable.

For simplicity purposes only, system 111 is described herein with respect to the design and construction of a steel structure for a building. However, it should be noted that system 111 is not limited to the construction of a steel structure for a building. Rather, it is to be understood that system 111 could be utilized in connection with the construction of a steel structure for alternative types of constructs, such as bridges or car frames, without departing from the spirit of the present invention.

As can be seen, system 111 is similar to system 11 in that system 111 includes an architect 113 responsible for, inter alia, creating the overall design of the building, a structural engineer 115 responsible for, inter alia, designing the basic steel structure to handle the load requirements of the building, a general contractor 117 responsible for, inter alia, overseeing the erection of the steel structure of the building at the building site, a fabricator 119 responsible for, inter alia, supplying to general contractor 117 the various steel structure materials to the engineered specifications, a connection engineer 121 responsible for, inter alia, determining certain general connection parameters for each joint in the steel structure, and a steel detailer 123 responsible for, inter alia, modeling the steel structure and finalizing the particular means of connection between various structural members based on the specific load requirements established by construction engineer 121.

As will be explained further in detail below, the engineering parameters established by connection engineer 121 are entered into a novel computer-aided modeling system which, in turn, automatically details each joint in the steel structure and incorporates the results of the detailing process directly into the computer model. In this manner, the computer-aided modeling system of the present invention greatly simplifies both the engineering and detailing processes. Accordingly, although connection engineer 121 and steel detailer 123 are represented in system 111 as being two separate entities, the significant ease of use and efficiency in implementation associated with the novel modeling system would enable both the engineering and detailing processes to be undertaken by a single entity, if desired.

System 111 differs primarily from prior art system 11 in that system 111 includes a connection processing subsystem, or connection subsystem, 125 that is responsible for receiving connection engineering data relating to a particular section of a steel structure, determining the connection details for each joint in the section based on the previously established engineering parameters set forth, and exporting the determined connection details to detailer 123 for automated incorporation back into the steel structure modeling system.

Connection processing subsystem 125 includes a server 127 designed to perform the primary tasks of connection subsystem 125 and a database 129 designed to store data and reports relating to the various connection jobs undertaken by server 127. As can be seen, server 127 is preferably a cloud-based server and is thereby accessible via internet 129 or other similar communication network, such as a local area network.

As a feature of the present invention, selected participants of system 111 are provided with web-enabled compute devices 131. Accordingly, each compute device 131 is capable of not only directly receiving the connection details for a particular steel structure but also, in certain instances, imparting certain connection preferences which may affect the connection details for the steel structure. As a result, system 111 greatly facilitates the flow of information between entities and, in addition, allows for the connection engineering and detailing processes to be reviewed and influenced by all pertinent parties, which is a principal feature of the present invention.

Structural Steel Engineering and Connecting Method 211

Figure 3:
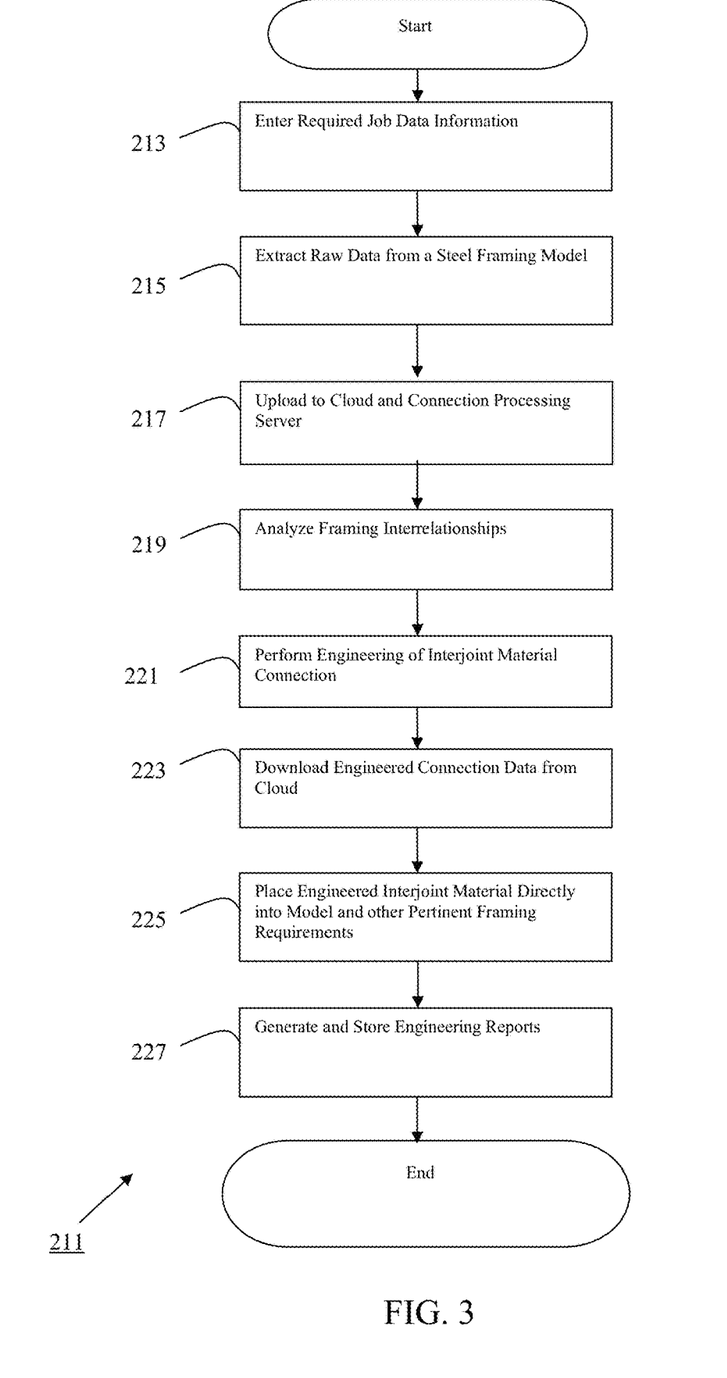
FIG. 3 is a flow chart of a method for engineering and detailing a steel structure using the system shown in FIG. 2, the method being set forth according to the teachings of the present invention.

Referring now to FIG. 3, there is shown a simplified flow chart of a novel method for engineering and connecting a steel structure via system 111, the method being described according to the teachings of the present invention and identified generally by reference numeral 211. As will be described in detail below, method 211 allows for the engineering and computer modeling of each joint in a steel structure and other pertinent framing requirements in an efficient, highly automated process.

Preferably, user implementation of method 211 is accomplished through execution of a computer-aided, structural steel framing information processing system that is programmed in accordance with the parameters set forth in detail below. For instance, it is envisioned that user implementation of method 211 could be achieved through an add-in to any steel structure modeling program, the add-in being delivered to compute device 131 of the user from server 127 via internet 129 upon verification of authorization.

To commence method 11, the user (e.g. detailer 123) first enters the required job data information for the steel structure via the internet 125 to a web page generated from server 127.

The majority of the rather extensive job data information relates to the particular connection preferences and load range parameters established by connection engineer 121 for each joint in the steel structure. In other words, the settings selected on job data forms assign a set of instructions or parameters for interconnecting various members of the steel structure. For example, connection information entered in step 213 may include, among other things, minimum job requirements (e.g. the minimum load bearing requirement of each connection point), certain component preferences for steel fabricator 219 (e.g. if fabricator 219 can obtain certain components at a reduced cost), occupational safety and health administration (OSHA) requirements, and/or other design criteria for each type of connection. As can be appreciated, hundreds of connection parameters and preferences are commonly considered when engineering the interconnection of members in a steel structure.

The job data is preferably input by the user via the internet 125 to a web page from server 127. For instance, referring now to FIG. 4, there is shown a sample screen display for entering job data, the sample screen display being identified generally by reference numeral 311. As can be seen, screen display 311 includes a series of tabs 313-1 thru 313-13 arranged vertically along the left-side of the page. Each tab 313 directs the user to a page for inputting a particular category of job data information.

Figure 4:
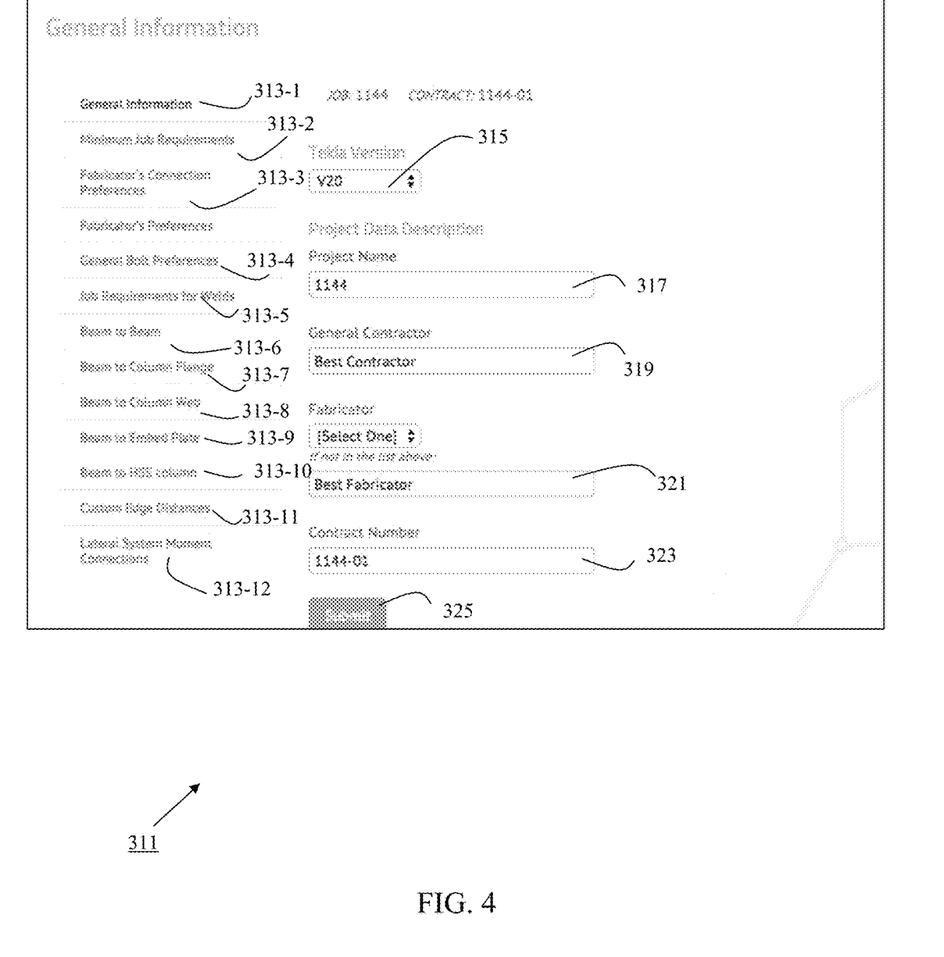
FIG. 4 is sample screen display for entering job data in the collection step shown in FIG. 3.

For instance, tab 313-1 pertains to general job data information and, as such, includes a software modeling identification window 315, a project name window 317, a general contractor window 319, a fabricator window 321, and a contract number window 323. Screen display 311 additionally includes a submit button 325 for transmitting the job data information, once fully entered, to connection subsystem 125.

As referenced above, a series of tabs 313 is provided to enter various categories of job data information. As can be seen, screen display 311 includes general information tab 313-1, a minimum job requirements tab 313-2 that establishes the minimum job requirements defined by structural engineer 115 (e.g. seismic provisions, whether to consider axial load requirements in beam to beam connections, material grade requirements, minimum/maximum material thickness, etc.), a fabricator's connection preferences tab 313-3 that establishes the connection preference order for each joint category as defined by fabricator 119 (e.g. to save in material costs), a fabricator's preferences tab 313-4 that establishes other preferences of fabricator 119 (e.g. part numbering, preferred angle sizes, minimum beam setbacks, etc.), a general bolt preferences tab 313-5 that establishes bolt-related preferences (e.g. maximum column flange thickness to be secured with bolts, bolt diameter and strength type, and hole type to receive certain bolts), a job requirements for welds tab 313-6 that establishes weld-related preferences (e.g. minimum/maximum weld size, preferred weld types for particular connections), a beam to beam tab 313-7 that establishes basic preferences for beam to beam connections, a beam to column flange tab 313-8 that establishes the basic preferences for beam to column flange connections, a beam to column web tab 313-9 that establishes the basic preferences for beam to column web connections, a beam to embed plate 313-10 that establishes the basic preferences for beam to embed plate connections, a beam to HSS column tab 313-11 that establishes the basic preferences for beam to HSS column connections, a custom edge distances tab 313-12 that establishes the basic preferences relating to edge distances, and a lateral system moment connections tab 313-13 that establishes the basic preferences relating to lateral system moment connections.

It should be noted that the add-in to the modeling program is not limited to the aforementioned categories of tabs 313 as well as the specific information requested in each corresponding page. Rather, it is to be understood that the program could request a modifiable collection of connection engineering information, possibly tailored to the particular project or user, without departing from the spirit of the present invention.

It should also be noted that it is envisioned that certain categories of information that relate to the structural preferences of a particular entity could be implemented directly by that entity to ensure compliance. For instance, it is envisioned that the minimum job requirements could be input by structural engineer 115 to ensure that the final connection details are rendered in compliance with the original steel structure design.

Referring back to FIG. 3, upon completion of job data information entering step 213, the user initiates the extraction of raw structural data from the steel framing computer model (i.e. data relating to the specific size, shape, orientation and interrelationship of structural members), the extraction step being identified generally by reference numeral 215. As will be explained further below, the raw data collected from the model is later utilized as part of an in-depth framing analysis.

Figure 5:
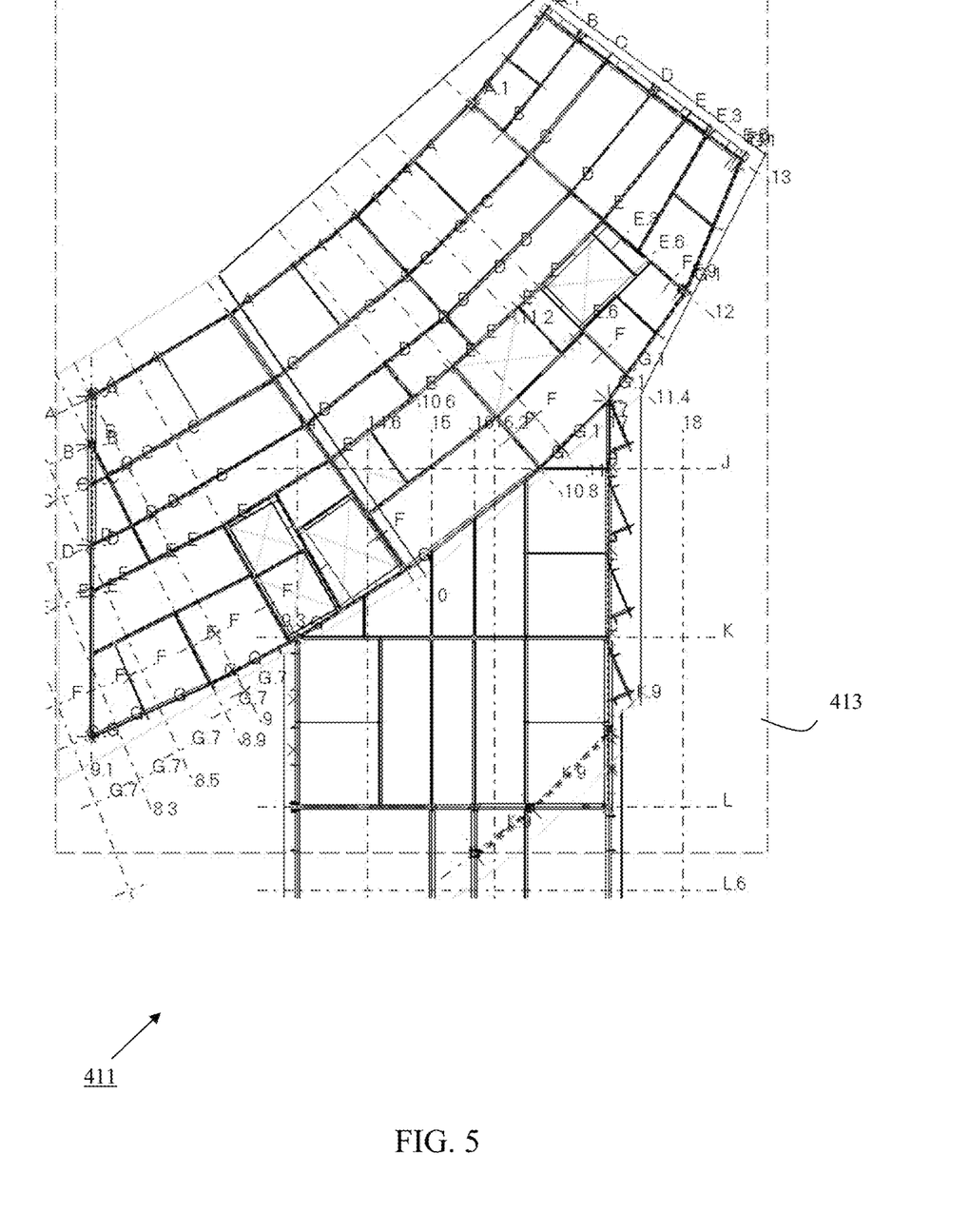
FIG. 5 is a sample screen display of a computer model of a framing level for a steel structure used in the raw data extraction step shown in FIG. 3.

To execute scan and extraction step 215, the user (e.g. detailer 123) opens up a framing level in the computer model. A sample screen display of a computer model of a framing level for a steel structure is depicted in FIG. 5, the screen display being identified generally by reference numeral 411. Using the computer model, the user is able to restrict scan and extraction step 215 to a particular portion, or section, of the frame structure by creating a selection window 413. The user then clicks on a menu option to run extraction process 215.

With the region of the structure selected for engineering and detailing, the compute device 131 responsible for execution of the engineering and detailing program automatically scans and extracts the raw steel data from the selected section of the computer modeled support structure. Data extraction step 215 can be repeated, as desired, for other framing areas or even the entire structure.

Referring back to FIG. 3, upon completion of extraction step 215, server 127 causes a pop-up window to appear on the compute device 131 for the user. The pop-up initiated by server 127 requests the user to login certain user-specific information, including an account name, password, company, job and session. Once the information is received and verified by server 127, the data previously extracted from the computer-modeled support structure in step 215 is automatically uploaded to server 127 via internet 125 as part of an uploading step 217. As will be explained further below, server 127 then utilizes the job data information compiled in step 213 as well as the raw structural data extracted from the computer modeled support structure in step 215 to commence engineering and detailing of the various joints in the designated framing area of the structure.

Once the raw steel framing data is received by server 127, the interrelationship between the various structural members in the model is analyzed by server 127 in detail, this step being identified generally by reference numeral 219. Specifically, the steel framing is sorted and organized in an efficient, automated fashion.

In analyzing framing interrelationships, the data is preferably processed as follows. For connections between various framing members, server 125 utilizes a method, referred to herein as "Determine Connections," that uses functions to perform geometrical calculations, member comparisons, data sorting and organizing. More specifically, the Determine Connections method begins by sorting the raw structure data into a list of all the members to be connected. Using information about each member from the list of members to be connected, a function referenced herein as "Determine Intersections" creates a list of all the Joint Coordinates of intersecting members. A single Joint Coordinate (JC) consists of one main and one secondary member. The main member is the supporting member, the secondary member is the member to be supported by the main member. In addition to the information about the members, a single Joint Coordinate contains all of the other (computed) parameters/information required for subsequent engineering of interjoint material connection.

The list of all the Joint Coordinates is then analyzed and its members are grouped, as part of step 219. Joint Coordinate Groups contain information between each of the individual joint coordinates to define a common joint coordinate. A single Joint Coordinate Group (JCG) consists of one Main Joint Coordinate and one or more Secondary Joint Coordinate(s). In addition to Determine Connections, other methods such as Determine OSHA and Determine HVAC Penetrations are used in framing analysis step 219. All of the aforementioned methods are strictly to analyze the coordinate relationship between steel members, not to engage in the design of any substantive engineering connections.

Upon completion of step 219, server 127 automatically engineers each interjoint connection, as represented by step 221. As will be explained further in detail below, engineering step 221 cross-references the output from the framing interrelationships determined in analyzing step 219 with the job data information collected in step 213 to engineer each interjoint in an optimized fashion.

In particular, the job data information collected in step 213 is assigned to individual Joint Coordinate Groups. This assignment allows for engineering the interjoint material required to establish permanent connectivity between parts in each of the Joint Coordinate Groups. Each Joint Coordinate is provided with a list of materials for the engineered interjoint as well as a connection type. The list of interjoint materials is identified in each of the available connection types. The engineering of interjoint material takes into account information from individual Joint Coordinates in Joint Coordinate Groupings. This capability to compare and reference another Joint Coordinate and its respective interjoint material in relation to the overall Joint Coordinate Grouping renders the engineering-connecting process thorough and complete. The unique lists of various Joint Connecting Groups created from the Determine Connections function allows for comparing/checking each and every connection detail at each Joint Connection against connection details of other Joint Connections in the Joint Connection Group, thus allowing to re-use details from previously detailed Joint Connecting Groups. In addition, engineering step 221 accounts for all the possible limitations set forth through in job data collection step 213 (e.g. spatial/loading constraints). It can be appreciated that, when any of the constraints are violated, engineering step 221 allows for a contingency plan, allowing for automatic reassignment of the Joint Coordinate to a more appropriate connection type.

Additionally, engineering step 221 checks for existing engineered details created prior to extraction step 215. In other words, method 211 can be repeated multiple times, for any number of framing areas of the model. If prior details/engineering exists, method 211 compares, or matches, the previously engineered connection details (reported on job standards) for each Joint Coordinate Grouping condition determined in step 219 and, in turn, loads the engineered connection details for each of the Joint Coordinate Groupings that matched. By contrast, if step 221 determines that prior details/engineering does not exist, then determined grouping for each joint not connected/engineered in the support structure is automatically integrated into a corresponding job standard form and a new detail/engineering is generated for that Joint Coordinate Grouping.

As referenced above, method 211 automatically engineers, or designs, the connection details for each joint in the support structure. This automated engineering process accounts for the load-responsibility of each member as well as its spatial relationship within the steel structure. In addition, various factors, such as skew, slope, elevation variations, clearances, weld locations etc, are taken into account during the engineering process.

The engineering process is primarily broken down into categories between structural members (i.e. beam to beam, beam to column flange, beam to column web, beam to embed plate) and characteristics of framing conditions (e.g. shear plate, double angle, single angle). The engineering program performs the engineering of each joint by taking into account force loading conditions (e.g. slope, skew, elevation differences, reaction requirements, axial force information and moment connections) as well as job data information entered in step 213 (e.g. any minimum requirements, fabricator's preferences and specific details that structural engineer 115 required).

As one principal feature of the present invention, engineering step 221 takes into the details of neighboring connections when engineering a particular joint. Often, many connection members are framing in the same general location. Accordingly, a key capability of this invention is that the engineering process produces connection details for a group of joints within a Joint Coordinate Group. This allows for coordination of load transfer between joints and impact of one joint on another in the group as a whole.

For instance, when engineering the connection of a beam to a column, it is important to note connection details of the same beam to other steel structures. This is because certain types of connections may affect the load bearing characteristics of other neighboring connections. As an example, if holes are formed in a beam at one location to receive connective bolts, the inclusion of the holes may affect the load bearing capabilities of the beam at another location along its length, thereby requiring the joint to be engineered in view of this load bearing variance.

As another principal feature of the present invention, engineering step 221 utilizes an iterative engineering process to determine the least expensive joint connection means that is in compliance with the structural requirements of the joint. Specifically, as part of step 221, server 125 engages in a process by which the least expensive connection means that is in compliance with the standards set forth in job data collection step 213 is evaluated to determine whether it meets the requisite structural loads. If the load requirements are met, the connection means is adopted into the connection engineering plans. If the connection means does not meet the required structural loads, the next iterative connection means is similarly evaluated. The process continues until the connection means meets the required structural loads. In this manner, each joint is engineered in the most cost-effective fashion, whereas traditional connection engineering processes routinely overdesign joints, thereby adding a significant cost component.

As an example of the iterative engineering process, the thickness of a shear plate to be used in a particular joint is typically defined by connection engineer 221 to fall within a defined range. As part of the iterative engineering process, the minimum thickness of the shear plate that can be utilized is incorporated into the steel structure and evaluated by server 125 in view of, inter alia, certain job data information relating to the shear plate that was input by the user in step 213 (e.g. the particular material to be used for the shear plate). Consequently, if the minimum thickness of the shear plate can support the requisite loads, that minimum thickness value is utilized in the connection engineering plans. However, if the shear plate cannot support the requisite loads, the thickness of the shear plate is increased in defined increments until it can support the requisite loads. As a result, the iterative engineering process eliminates any overdesigning of the joint resulting from using a shear plate that is excessively thick and, as a consequence, unnecessarily expensive.

As another example of the iterative engineering process, the number of bolts to be incorporated in a particular joint is typically defined by connection engineer 221 to fall within a defined range. As part of the iterative engineering process, the minimum number of bolts that can be utilized is incorporated into the steel structure and evaluated by server 125 in view of, inter alia, certain job data information relating to the bolt that was input by the user in step 213 (e.g. the particular bolt type to be used). Consequently, if the minimum number of bolts can support the requisite loads, that minimum number is utilized in the connection engineering plans. However, if the bolt arrangement (quantity and layout) cannot adequately support the requisite loads, the number of bolts is increased in defined increments until it can support the requisite loads. As a result, the iterative engineering process eliminates overdesigning of the joint by using too many bolts and, as a consequence, unnecessarily expensive.

As yet another example of the iterative engineering process, the use of doubler plates in reinforcing beam strength, as well as the double plate thickness, can engineered in an iterative fashion to prevent overdesigning. As can be appreciated, a doubler plate is often utilized to reinforce the strength of a beam that may be compromised, inter alia, due to the inclusion of complementary holes and bolts. As part of the iterative engineering process, the strength of a particular beam is evaluated by server 125 to determine whether the requisite beam strength is met. If the beam can support the requisite loads, a doubler plate is not utilized in the connection engineering plans. However, if the beam cannot adequately support the requisite loads, a doubler plate of minimum thickness is incorporated into the steel structure and evaluated by server 125. The thickness of the doubler plate is then determined through an iterative process to prevent overdesigning of the joint by using a doubler plate that is excessively thick and, as a consequence, unnecessarily expensive.

Upon completion of engineering step 221, a library of Job Standards, representative of the extracted framing with the engineered connection details, is updated and stored in database 127. Additionally, a list of special Joint Connection Groups is generated that shows any connections that server 125 was unable to connect.

It should be noted that the style or format of the job standard form generated by server 125 is not limited to any particular format. Rather, although a default job standards format is automatically provided in the design of the program, an alternative job standards format could be created and used in place thereof without departing from the spirit of the present invention.

As seen in FIG. 3, the output of engineering step 221 (i.e. the connection means for each joint in the steel structure) can be imported by the user through activation of a control provided in the user-interface of the add-in software. As part of step 223, activation of the control causes the engineered data to be downloaded from database 127 and uploaded back into user compute device 131.

In turn, the imported data relating to the interjoint material connection details is integrated back into the structural steel framing software model in step 225. As a result, the structural steel framing software model would detail the engineered means of connection between interconnected structural members. Additionally, the interjoint connection material is also grouped in the model according to the Joint Coordinate Grouping reference from which it originated.

After completion of data importing step 225, no further detailing adjustments need to be made to any of the details modeled using method 211, as all the connection information has been downloaded from database 127 to the user modeling tool.

It should be noted that many products used for structural steel framing allow the user to use a connection type from a library of available connection types that are sometimes called macros. In addition, many products allow the user or $3^{rd}$ party companies to create custom items that contain two or more objects that make up a collection of interjoint material. Importing step 225 uses a technique that generates collections of interjoint material as needed based on exact engineering requirements using a single custom object that is redefined for each joint.

In the final step of process 211, detailed reports are automatically generated by server 125 that are stored in database 127, the report generation step being identified generally by reference numeral 227. As a result, any authorized entity in communication with subsystem 123 can receive, review and evaluate the results that were inputted into the computer model, which is highly desirable. The completion of report generation and review step 227 results in the conclusion of method 11.

It should be noted that server 125 automatically generates several different types of detailed connection reports that, inter alia, (i) identify any problem conditions or errors in the engineering process, (ii) contain a log of errors while the model was detailed, and (iii) contain detailed job standard reports and the ability to drill down to the actual calculations in engineering.

Features and Advantages of Method 211

As can be appreciated, the automated structural detailing method described in detail above provides a number of significant improvements over computer-implemented structural detailing processes that are currently known in the art.

As a first advantage, the automated structural detailing method of the present invention allows for the integration of the two distinct and separate steps in the structural detailing process (namely, the structural connection detail engineering process and modeling process) into a single, all-in-one, highly automated computer program. In other words, a single computer-aided modeling system can effectively engineer steel framing connection details of a structural framing area in a highly automated fashion and, in turn, directly incorporate engineered connection detail parameters into the structural framing inside an electronic model.

As a second advantage, the automated structural detailing method of the present invention determines the specifics of every connection detail, such as bolts and welds, for each and every structural joint in the building that allows for engineering. Because engineering ranges are not used, the present method creates a definitiveness, or certainty, for each structural joint design.

As a third advantage, the automated structural detailing method of the present invention stores the connection details for each structural connection framing condition in electronic database 127. As a result, any authorized entity in communication with subsystem 123 can receive, review, and evaluate the details of every joint in a highly efficient manner, thereby facilitating the transmission of important connection details to various participants in steel structure construction system 111.

As a fourth advantage, the automated structural detailing method of the present invention is provided with the ability to capture and interpret challenging framing conditions and complex data information (e.g., varying elevations of connecting members, skews, slopes, and complex geometries) as part of its highly automated and intuitive engineering process. For instance, it should be noted that preferences can be created by the user that are automatically applied to the support structure model.

As a fifth advantage, the automated structural detailing method of the present invention facilitates the generation of customized reports for every joint that is engineered and connected which, in turn, can be used to identify problem framing areas, modeling errors and to provide engineers with full details of each connection that was designed.

As a sixth advantage, the automated structural detailing method of the present invention promotes a uniformity of connection terminology as well as consistent, rule-based engineering processes within both single-user and multi-user environments.

As a seventh advantage, the automated structural detailing method utilizes an iterative engineering process to determine the least expensive joint connection means that is in compliance with the structural requirements of the joint. In this capacity, each joint is engineered in the most cost-effective fashion.

The embodiments shown in the present invention are intended to be merely exemplary and those skilled in the art shall be able to make numerous variations and modifications without departing from the spirit of the present invention. All such variations and modifications are intended to be within the scope of the present invention as defined in the appended claims.

What is claimed is:

1. A system for engineering and detailing a plurality of joints in a steel structure, the system comprising:
   one or more servers configured to communicate with one or more compute devices, wherein the one or more servers are programmed to:
   receive raw data extracted from a computer model of a steel structure, set connection preferences, and load-bearing requirements, wherein the raw data, the set connection preferences, and the load-bearing requirements are received from the one or more compute devices;
   automatically determine a plurality of joint coordinates between a plurality of structural members from the raw data; and
   automatically iteratively engineer a means of connection for the plurality of joint coordinates by:
   assigning, for each joint coordinate of the plurality of joint coordinates, a connection type and a list of materials from the set connection preferences, and loading constraints based on the load bearing requirements; and
   iteratively engineering the means of connection for one or more of the plurality of joint coordinates while considering the means of connection for one or more other joint coordinates based on the connection type, one or more alternate connection types for the plurality of joint coordinates, the list of materials, material costs for the list of materials, and the load constraints for the plurality of joint coordinates.

2. The system as claimed in claim 1 wherein the means of connection engineered by the one or more servers is configured to be uploaded into the one or more compute devices for integration into the computer model of the steel structure.

3. The system as claimed in claim 1 wherein the one or more servers generate at least one report relating to the means of connection for each of the plurality of joints.

4. The system as claimed in claim 3 wherein the one or more servers are internet accessible.

5. The system as claimed in claim 1, wherein the raw data, the set connection preferences, and the load-bearing requirements are received from a first compute device of the one or more compute devices, wherein the one or more servers are further programmed to:
   receive, from a second compute device of the one or more compute devices, a request to modify the set of connection preferences defined by the first compute device.

6. The system as claimed in claim 1, wherein the one or more servers are further programmed to:
   determine a violation of at least one of the loading constraints; and
   automatically reassign a new connection type to a joint coordinate from the plurality of joint coordinates associated with the violation of the at least one of the loading constraints.

7. The system as claimed in claim 1, wherein automatically determining the plurality of joint coordinates between the plurality of structural members further comprises:
   determining at least one set of intersecting members of the plurality of structural members to be connected; and
   constructing the plurality joint coordinates for the at least one set of intersecting members, wherein each joint coordinate of the plurality of joint coordinates comprises:
   a main member, wherein the main member is a supporting member; and
   a secondary member to be supported by the main member.

8. The system as claimed in claim 7, wherein the one or more servers are further programmed to:
   construct one or more joint coordinate groups based on the plurality of joint coordinates, wherein each joint coordinate group of the one or more joint coordinate groups comprises:
   a main joint coordinate; and
   one or more secondary joint coordinates; and
   establish permanent connectivity between parts of each joint coordinate group of the one or more joint coordinate groups.

9. The system as claimed in claim 1, wherein automatically iteratively engineering the means of connection for the plurality of joint coordinates further comprises:
   checking for an existing means of connection created for each of the joint coordinates; and
   assigning the existing means of connection for each of the joint coordinates when one exists;
   wherein assigning the connection type and the list of materials from the set connection preferences, and the loading constraints based on the load bearing requirements when the existing means of connection for each of the joint coordinates does not exist.

10. A method for engineering and detailing a plurality of joints in a steel structure, the method comprising the steps of:
providing one or more servers in electrical communication with one or more compute devices;
receiving, by the one or more servers, raw data extracted from a computer model of a steel structure, set connection preferences, and load bearing requirements, wherein the raw data, the set connection preferences, and the load-bearing requirements are received from the one or more compute devices;
automatically determining a plurality of joint coordinates between a plurality of structural members from the raw data; and
automatically iteratively engineering a means of connection for the plurality of joint coordinates by:
assigning, for each joint coordinate of the plurality of joint coordinates, a connection type and a list of materials from the set connection preferences, and loading constraints based on the load bearing requirements; and
iteratively engineering the means of connection for one or more of the plurality of joint coordinates while considering the means of connection for one or more other joint coordinates based on the connection type, one or more alternate connection types for the plurality of joint coordinates, the list of materials, material costs for the list of materials, and the loading constraints for the plurality of joint coordinates.

11. The method as claimed in claim 10 wherein the means of connection engineered by the one or more servers is configured to be uploaded into the one or more compute devices for integration back into the computer model of the steel structure.

12. The method as claimed in claim 10 further comprising generating at least one report by the one or more servers relating to the means of connection for each of the plurality of joints.

13. The method as claimed in claim 12 wherein the one or more servers are internet accessible.

14. The method as claimed in claim 10, wherein the raw data, the set connection preferences, and the load-bearing requirements are received from a first compute device of the one or more compute devices, wherein the method further comprises:
receiving, from a second compute device of the one or more compute devices, a request to modify the set of connection preferences defined by the first compute device.

15. The method as claimed in claim 10, wherein the method further comprises:
determining a violation of at least one of the loading constraints; and
automatically reassigning a new connection type to a joint coordinate from the plurality of joint coordinates associated with the violation of the at least one of the loading constraints.

16. The method as claimed in claim 10, wherein automatically determining the plurality of joint coordinates between the plurality of structural members further comprises:
determining at least one set of intersecting members of the plurality of structural members to be connected; and
constructing the plurality joint coordinates for the at least one set of intersecting members, wherein each joint coordinate of the plurality of joint coordinates comprises:
a main member, wherein the main member is a supporting member; and
a secondary member to be supported by the main member.

17. The method as claimed in claim 16, wherein the method further comprises:
constructing one or more joint coordinate groups based on the plurality of joint coordinates, wherein each joint coordinate group of the one or more joint coordinate groups comprises:
a main joint coordinate; and
one or more secondary joint coordinates; and
establishing permanent connectivity between parts of each joint coordinate group of the one or more joint coordinate groups.

18. The method as claimed in claim 10, wherein automatically iteratively engineering the means of connection for the plurality of joint coordinates further comprises:
checking for an existing means of connection created for each of the joint coordinates; and
assigning the existing means of connection for each of the joint coordinates when one exists;
wherein assigning the connection type and the list of materials from the set connection preferences, and the loading constraints based on the load bearing requirements when the existing means of connection for each of the joint coordinates does not exist.

* * * * *